United States Patent [19]

Hu et al.

[11] Patent Number: 5,652,894
[45] Date of Patent: Jul. 29, 1997

[54] METHOD AND APPARATUS FOR PROVIDING POWER SAVING MODES TO A PIPELINED PROCESSOR

[75] Inventors: King Seng Hu; Vui Yong Liew, both of Penang, Malaysia

[73] Assignee: Intel Corporation, Santa Clara, Calif.

[21] Appl. No.: 536,087

[22] Filed: Sep. 29, 1995

[51] Int. Cl.$^6$ ................................................. G06F 1/32
[52] U.S. Cl. ........................... 395/750; 395/376; 364/707
[58] Field of Search ........................... 395/750, 375, 395/800, 733; 364/707; 340/825

[56] References Cited

U.S. PATENT DOCUMENTS

| | | | |
|---|---|---|---|
| 4,669,059 | 5/1987 | Little et al. | 395/750 |
| 4,847,616 | 7/1989 | Gotou et al. | 340/825 |
| 5,237,692 | 8/1993 | Raasch et al. | 395/740 |
| 5,274,831 | 12/1993 | Katsuta | 395/800 |
| 5,353,431 | 10/1994 | Doyle et al. | 395/416 |
| 5,457,801 | 10/1995 | Aihara | 395/750 |
| 5,504,910 | 4/1996 | Wisor et al. | 395/750 |

*Primary Examiner*—Gopal C. Ray
*Attorney, Agent, or Firm*—Blakely, Sokoloff, Taylor & Zafman

[57] ABSTRACT

A clock and reset unit for providing power saving modes to a pipelined microprocessor and for guaranteeing that power saving instruction is the last to be executed before the clocks stop, upon wake-up the next instruction executed is the first instruction in the interrupt service routine (ISR) and that upon return from the ISR, the instruction immediately following the power saving instruction is executed. A register is provided in the clock and reset unit for initiating a power saving mode. A software programmer selects a particular power saving mode by setting a corresponding bit in this register (i.e., writing a predetermined value to this register). A processor stalling signal generator for generating a signal that indicates to the processor that the peripheral is not ready to process a processor request (thereby causing the processor to insert wait states until the peripheral is ready) is provided. The clock and reset unit is also provided a signal from an interrupt handler indicating that the processor will be executing the ISR upon leaving the power save instruction. In response to this signal, the clock and reset unit de-assert the wait state request and brought the processor out of the power saving instruction.

6 Claims, 14 Drawing Sheets

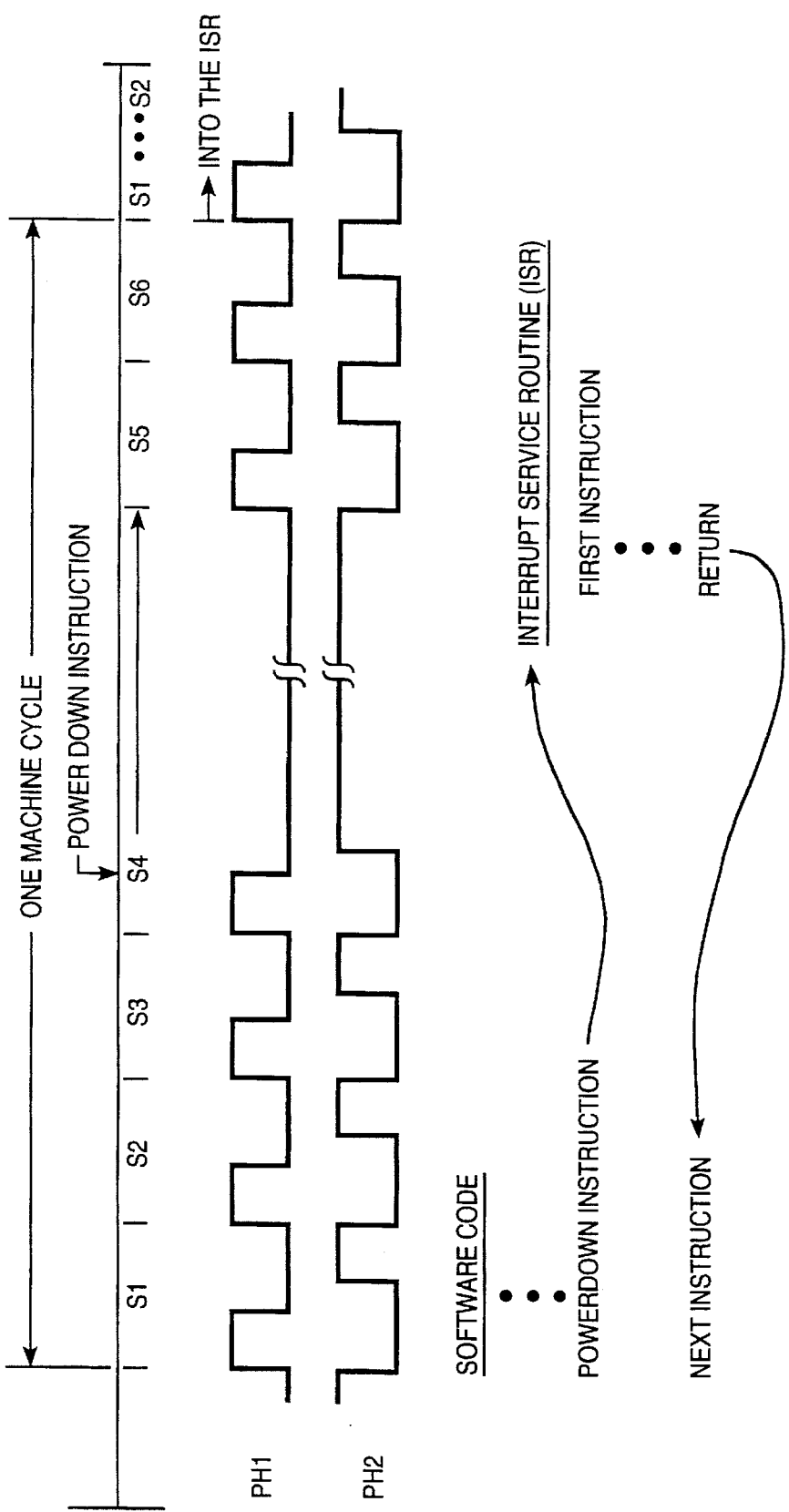
FIG._1

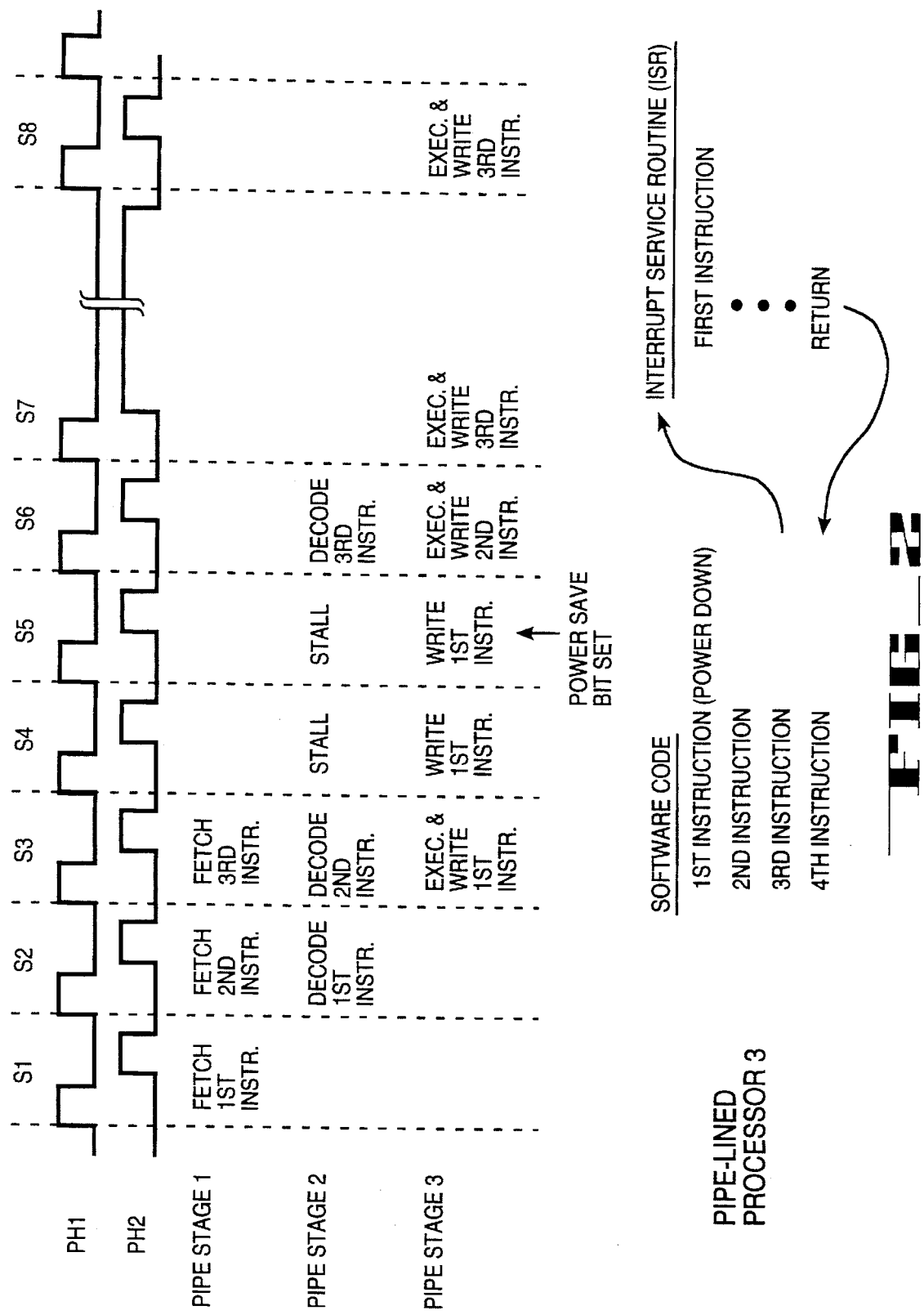

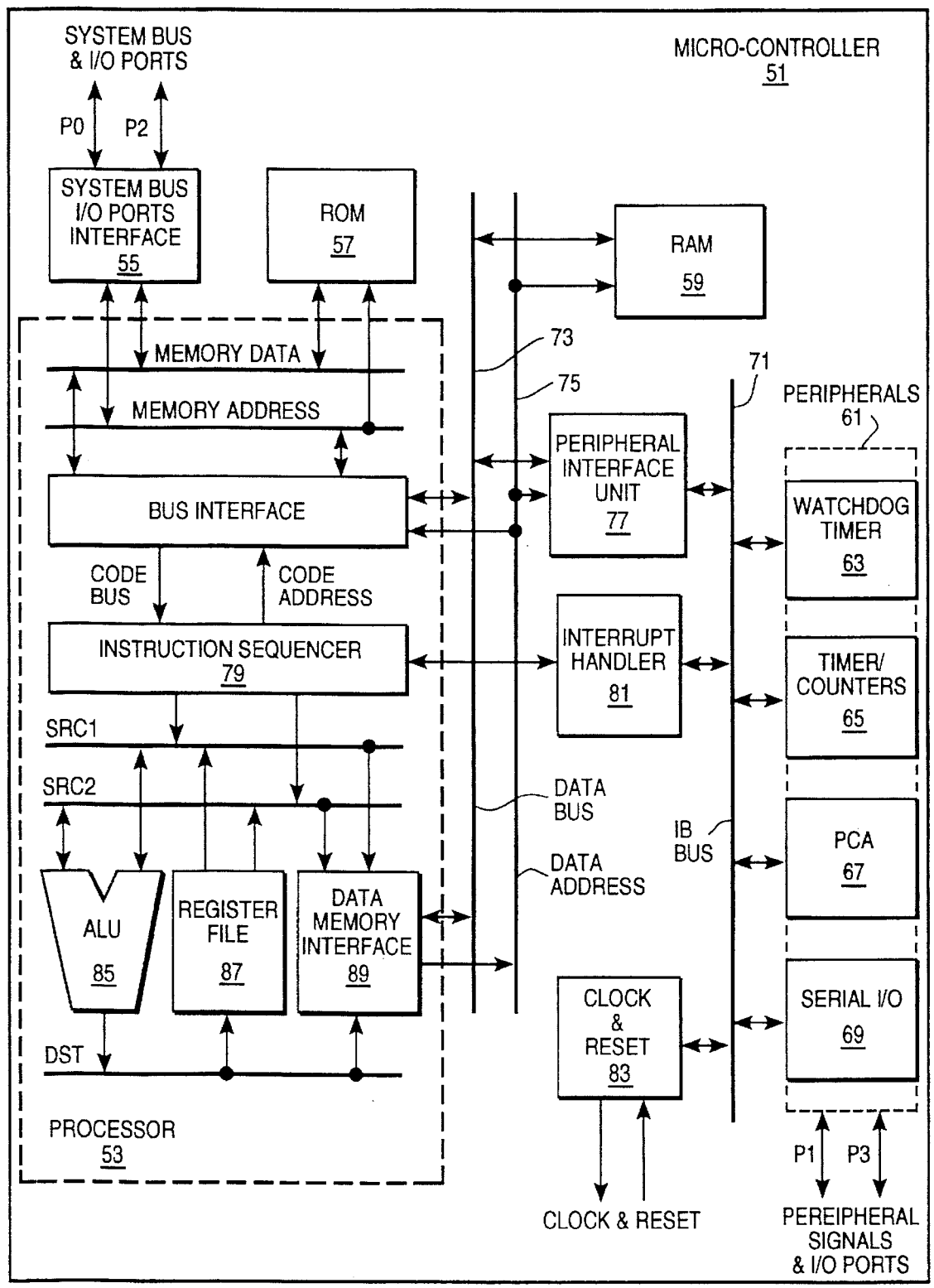
FIG_3

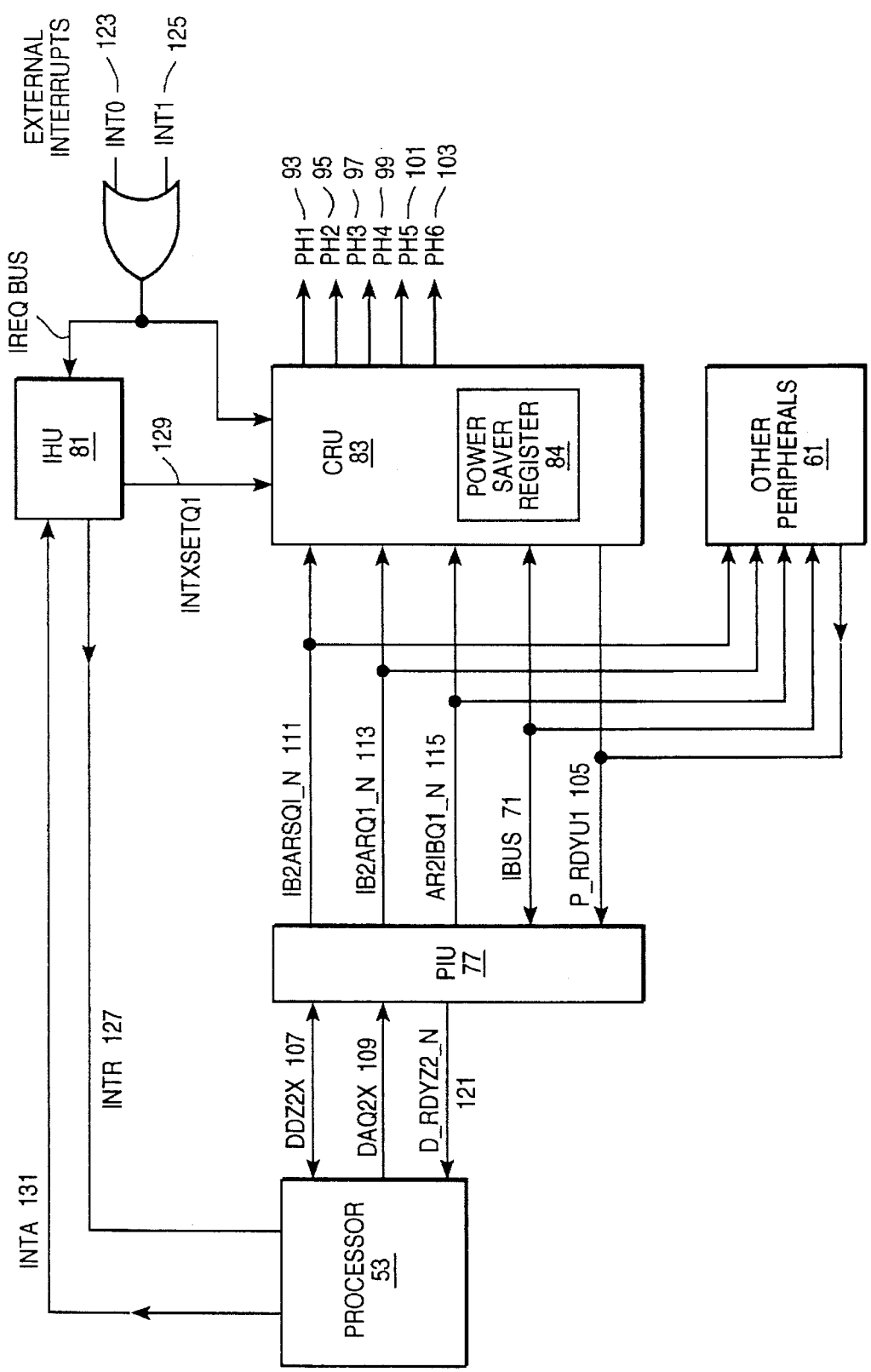
FIG_4

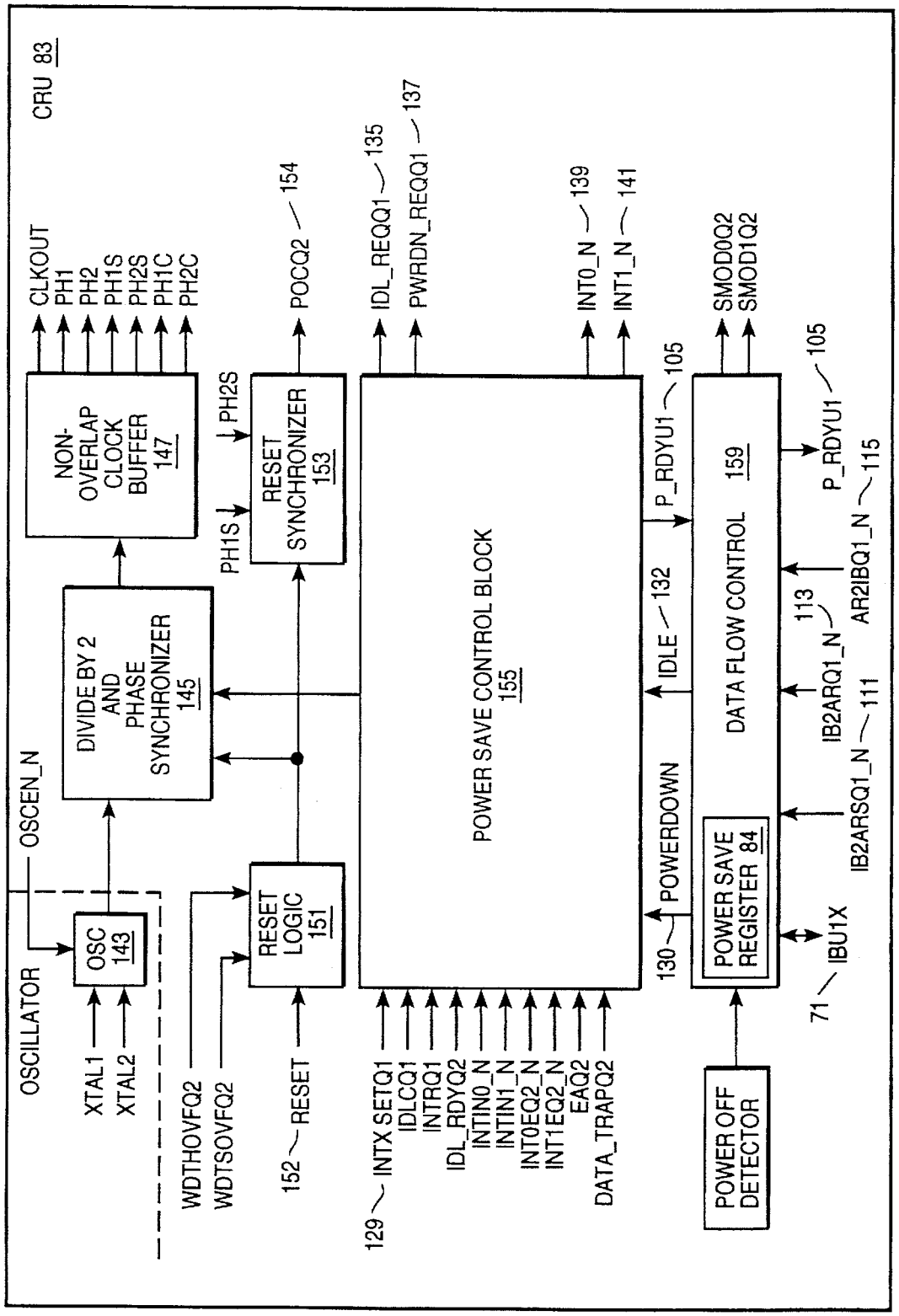
FIG_5

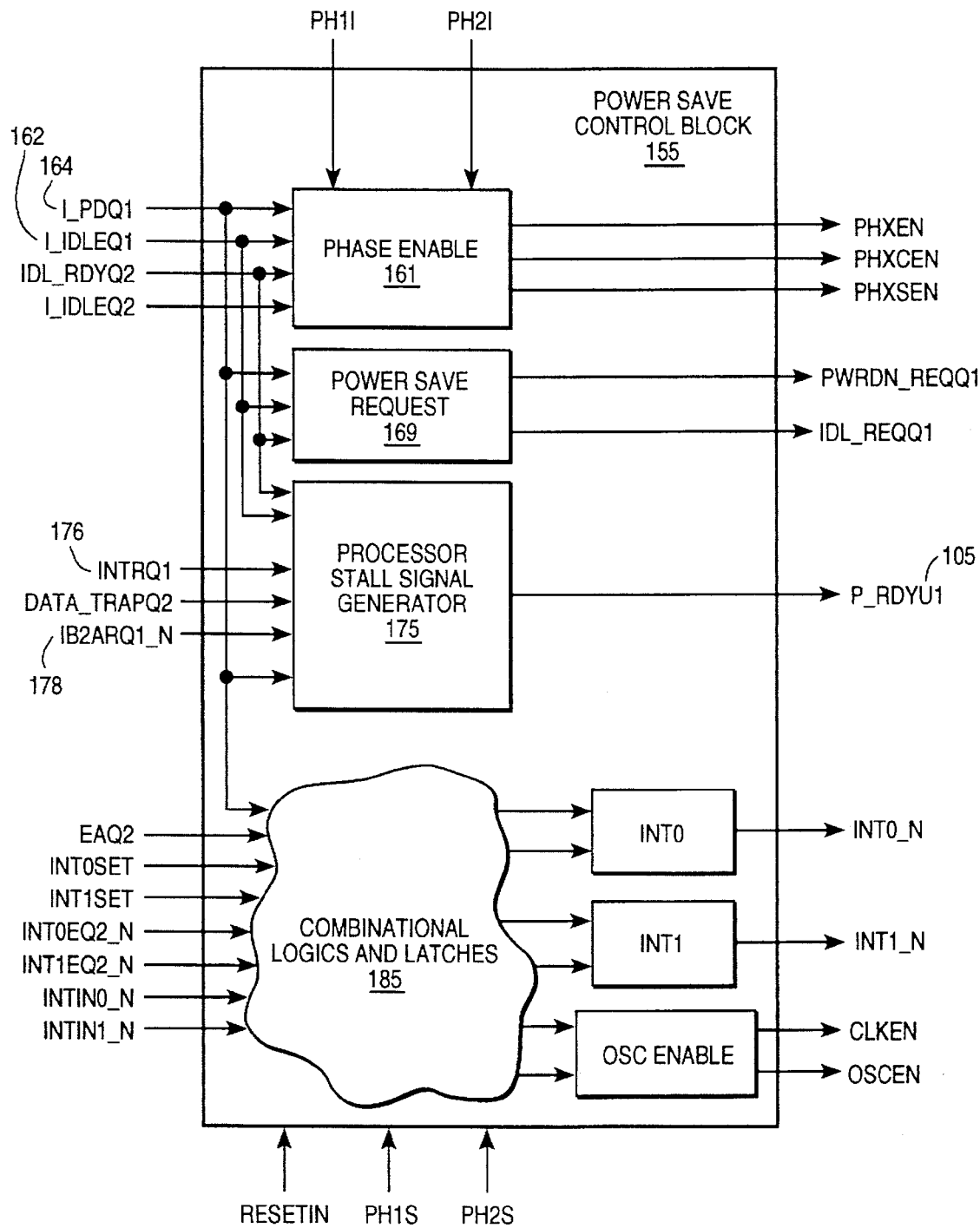
FIG_6

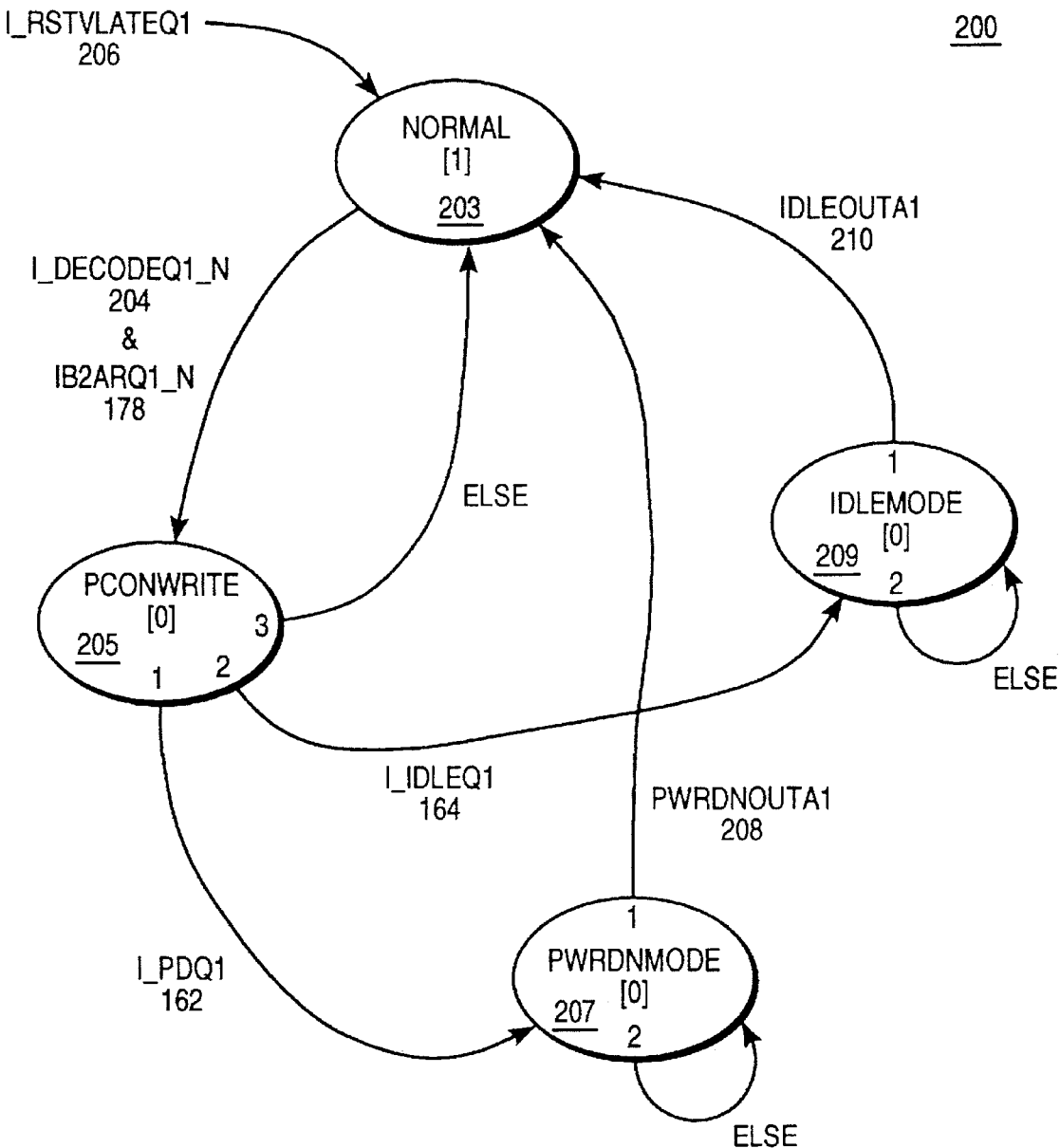
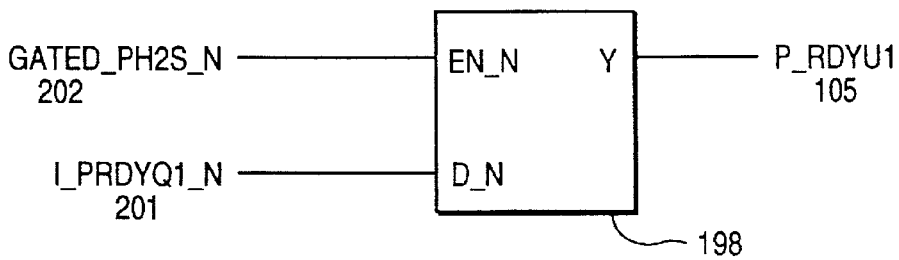
FIG_7

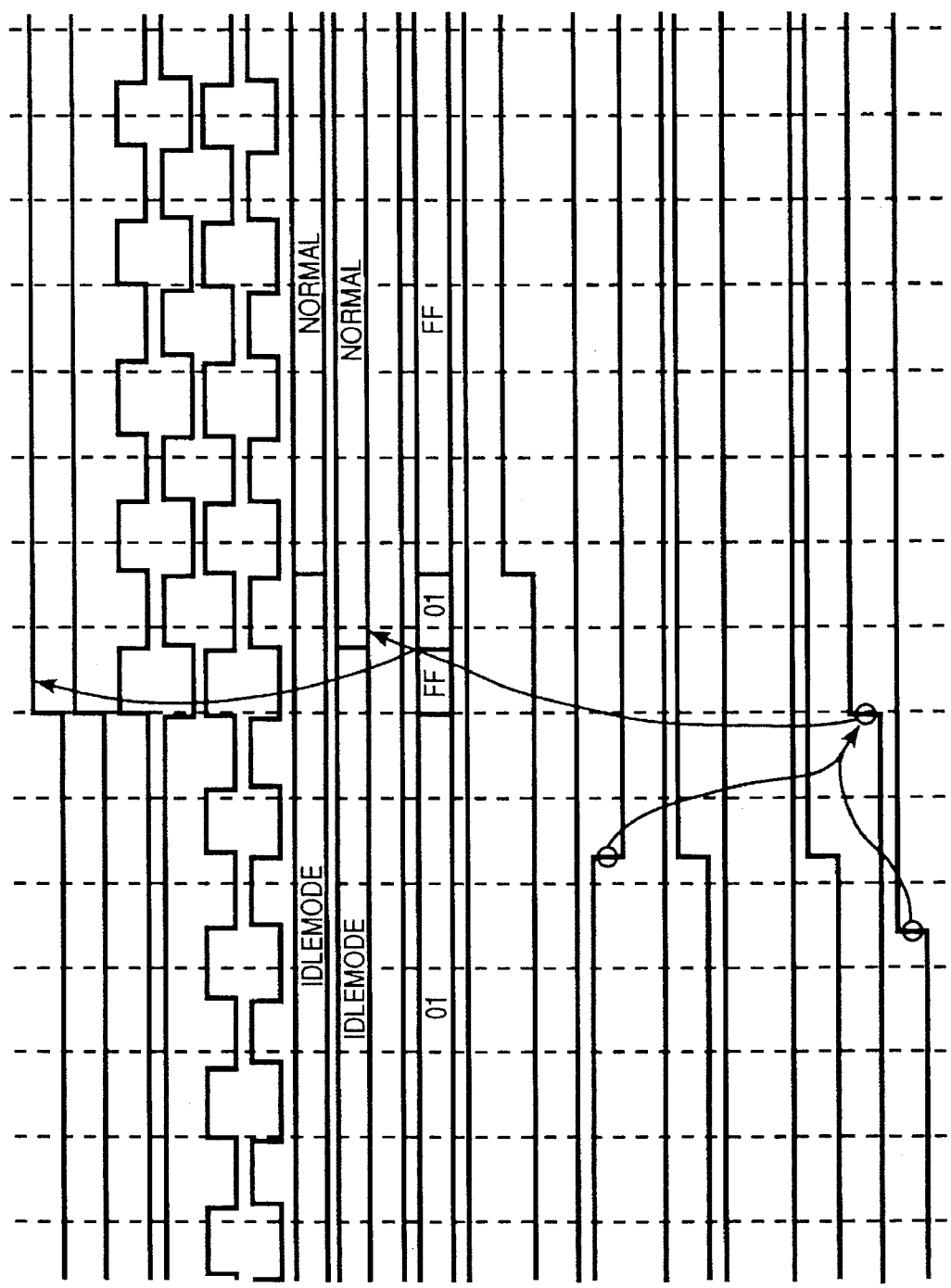
FIG_10

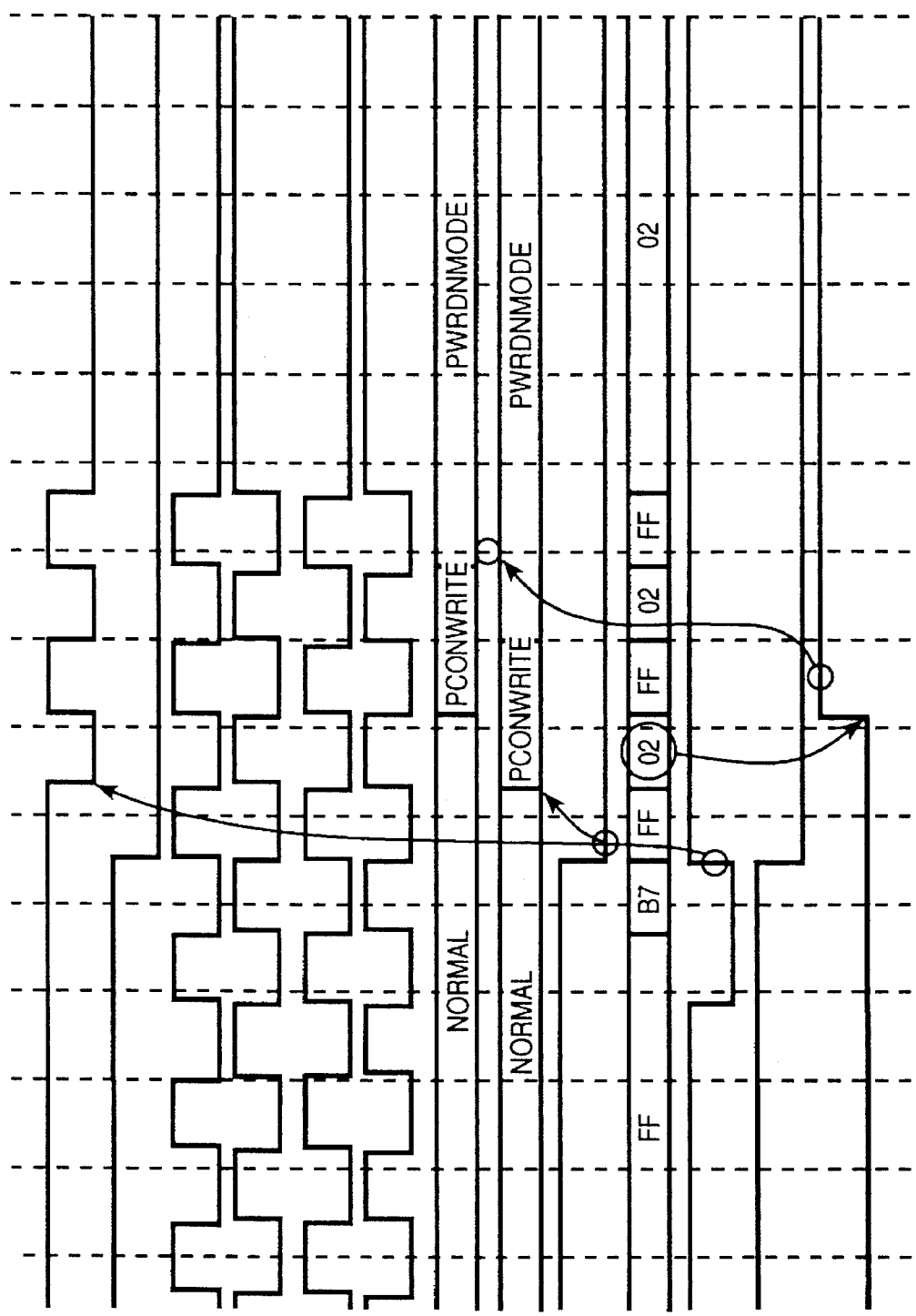
FIG_11

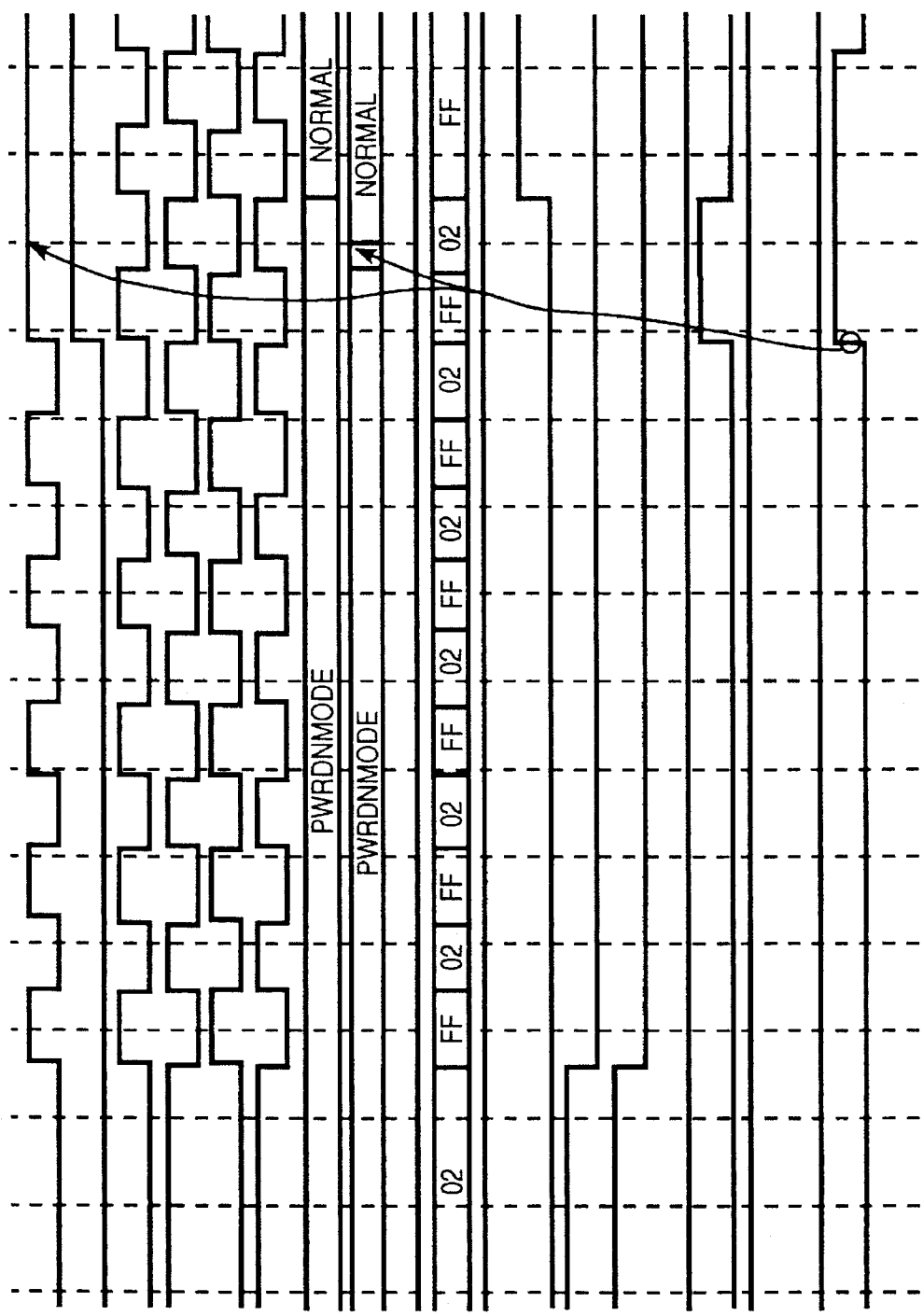
FIG_12

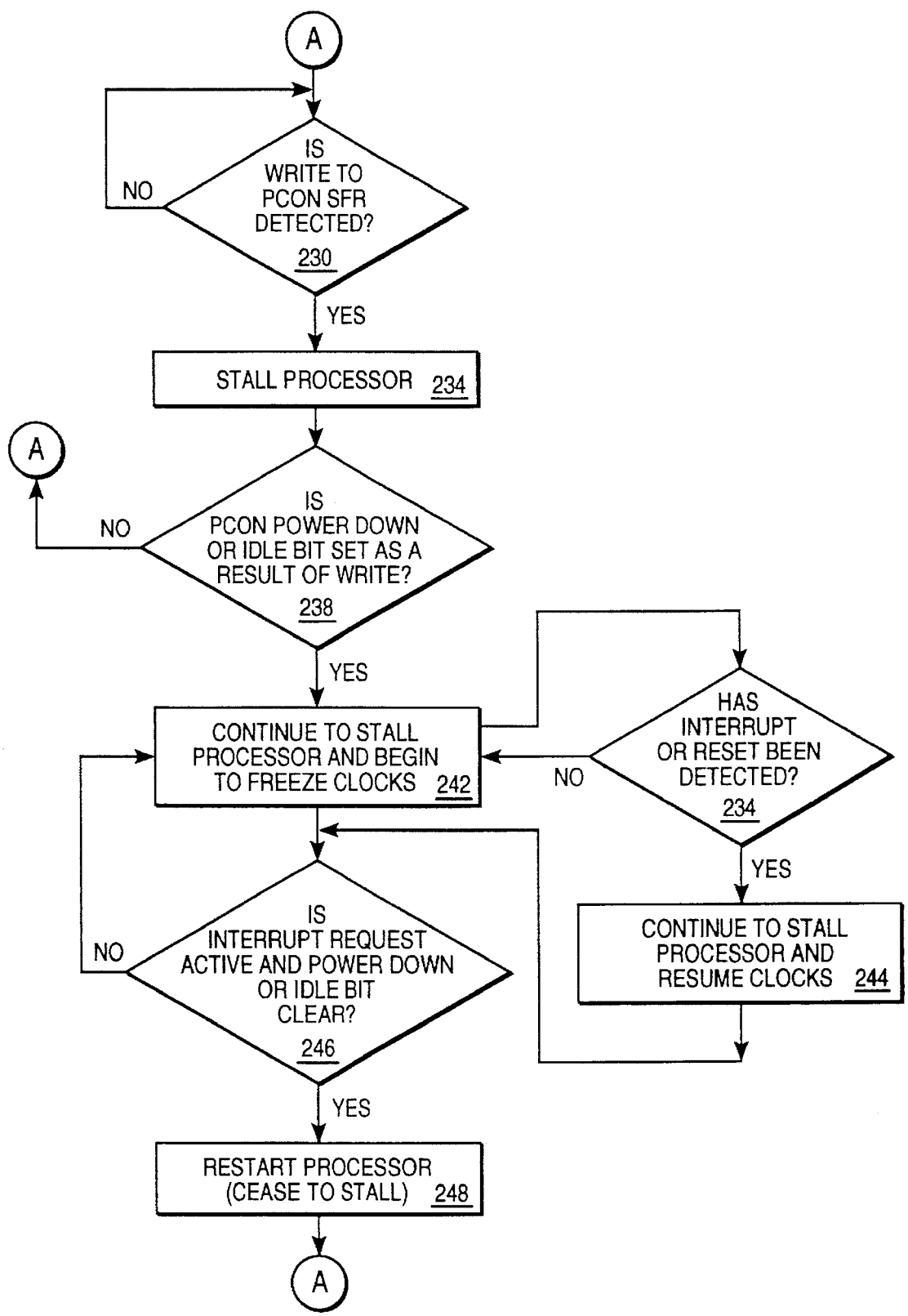
FIG_13

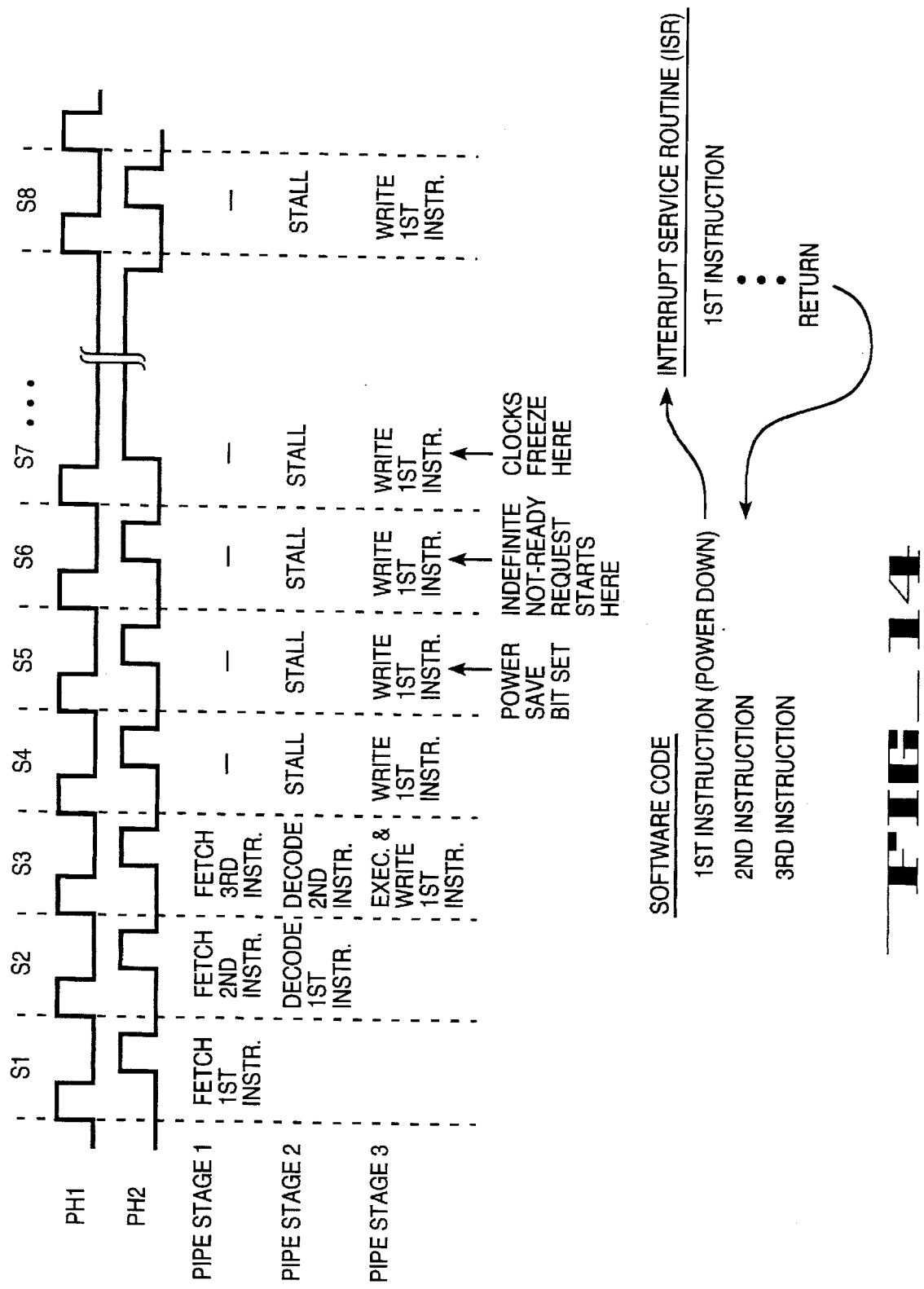

METHOD AND APPARATUS FOR PROVIDING POWER SAVING MODES TO A PIPELINED PROCESSOR

BACKGROUND OF THE INVENTION

1. Field of the Invention

The invention generally relates to processors and, in particular, to processors employing power-saving modes.

2. Description of the Related Art

Typical microcontrollers include processors that have power-saving modes (e.g., idle and powerdown modes). These modes are power reduction modes for use in applications where power consumption is a concern. User-programmed software instructions activate these modes by writing to a power saving register. The program execution halts, but resumes when the power saving mode is exited by an external interrupt or hardware reset.

FIG. 1 illustrates a power saving mode for a sequential processor 1 that is implemented in an Intel microcontroller (MCS 51). In this Intel Architecture the core processor utilizes machine cycles, each cycle including six states (i.e., S1–S6). Each state includes a first phase and a second phase. The phase one clock (PH1) and the phase two clock (PH2) provides two non-overlapping clocks for use by the computer system. Using non-overlapping clocks in a microprocessor architecture is well known in the art.

FIG. 1 also illustrates software code that includes a plurality of instructions. In the MCS a power saving instruction (e.g., powerdown instruction) is executed in state four (S4) of the machine cycle. Once the powerdown instruction has been executed, the phase clocks (PH1 and PH2) are frozen in the state in which they were when the power saving instruction was executed.

Since the phase clocks are both frozen, the program execution halts. An external source (i.e., a hardware reset or a external interrupt) must be utilized to bring the processor out of the power saving mode.

Taking the case of an external interrupt, once an external interrupt is detected, the phase clocks are restarted first, completing its current machine cycle, before branching to an interrupt service routing (ISR). The first instruction in the ISR is the first instruction executed by the processor when it comes out of the power saving mode. Please note that the first instruction is the first instruction being executed since the power saving instruction.

After the instructions in the ISR are executed, the last instruction in the ISR is a return from interrupt instruction. The return passes control back to the software code that was running before the power saving mode and branch to the ISR. Program execution of the software code resumes at the next instruction (i.e., the instruction immediately following the power saving instruction).

This Intel Architecture for the MCS has the following attributes. First, the phase clocks are stopped (i.e., frozen) within the power saving instruction cycle. Second, if wake-up from a power saving mode is accomplished by an interrupt, the next instruction executed is guaranteed to be the first instruction in the corresponding ISR. Third, upon return from the ISR, the instruction, immediately following the power saving instruction, is guaranteed to be executed next. Thus, this architecture provides both predictability and ensures uniformity in both the wake-up from a power saving mode and also the return from an ISR.

FIG. 2 illustrates a pipe-lined processor 3 in which instructions are segmented into stages for processing, and the stages of different instructions are overlapped (i.e., stages of different instructions are processed concurrently). For example, a first instruction (e.g., power saving instruction) includes three stages: a Fetch stage, a Decode and Read stage, and an Execute and Write-Back stage. In the first state (S1), the processor fetches the first instruction In state two (S2), the processor decodes the first instruction while fetching the second instruction. In S3, the processor concurrently executes the first instruction, decodes the second instruction and fetches the third instruction.

As can be seen from FIG. 2, the phase clocks are not frozen until the processor processes the Execute and Write-back stage of the third instruction (i.e., clocks are frozen in some state after S3). The phase clocks are frozen in some state after S3 because there is a delay in setting the bit set in power saving register.

Although this pipe-lined processor improves performance of the processor, the pipe-lined nature of the processor introduces uncertainty as to 1) when the clocks are frozen, 2) which instruction is executed upon wake-up from power saving modes and also 3) which instruction is executed upon a return from the interrupt service request (i.e., MCS51 attributes are no longer guaranteed).

For example, if the second instruction is an instruction that executes and completes in one stage, the second instruction will be executed before the phase clocks are frozen. In this case, upon wake up by an external interrupt, the first instruction in the ISR 37 occurs after the second instruction or later. Moreover, when the ISR 37 returns to the software code, a third instruction is the next instruction executed.

As can be seen from FIG. 2, in a pipelined processor the last instruction in the software code, before going into a power saving mode and branching to the ISR and the instruction after which it returns, depends upon the complexity of the second instruction (i.e., the number of stages required by the second instruction to complete). Thus, the branch to the ISR may occur after the power saving instruction, after a second instruction, or even a third instruction (as shown) depending on what the second and third instructions are.

In the example illustrated in FIG. 2, the power save bit is set in State 5 (S5). In State 6 (S6) the second instruction is executed. In State 7 (S7), the execution and write, associated with the third instruction, is carried out. Upon wake-up in State 8 (S8), the execution and write, associated with the third instruction, is completed. Thus, in this example, the branch to the ISR occurs during the third instruction, and the return from ISR occurs before the fourth instruction. This is very undesirable because the computer system behaves unpredictably, since this behavior is code specific (i.e., it can change for different software programs and even within different sections of the same program).

Accordingly, there is a need for a method and apparatus to provide predictability and uniformity in 1) when the program execution halts, 2) which instruction is executed upon wake-up and 3) which instruction is executed after a return from the ISR in a pipelined processor.

One proposed solution is to provide additional circuitry in the processor to detect a power saving command (i.e., idle and powerdown). The additional circuitry in the processor detects and decodes these power saving commands and correspondingly flushes any following commands before the branch to the ISR.

One disadvantage of this approach is that additional circuitry is required to treat the power saving command as a special hardware event. Additional circuitry is necessary to decode this special instruction and all the addressing modes for the operands of this special command.

These addressing modes includes register addressing (where the instruction specifies the register which contains the operands), immediate addressing (where the instruction contains the operand), direct addressing (where the instruction contains the operand address), indirect addressing (where the instruction specifies the register containing operand addresses), displacement addressing (where the sum of register and the assigned offset specified by the instruction is the operand address), relative addressing (where the instruction contains a relative offset from the next instruction to target the address) and the bit addressing (where the instruction contains the bit address). Accordingly, additional circuitry is required to decode each of the above-noted cases.

In addition, circuitry is further required for flushing the following commands that are in the pipeline at the time of entering a power saving mode. This process of flushing commands is complex and requires its own overhead.

Consequently, there is a need for a method and apparatus for providing power saving modes to a pipeline microprocessor that ensures uniformity and predictability upon wake-up and return from ISR without the problems noted in the proposed solution.

BRIEF SUMMARY OF THE INVENTION

The present invention provides a method and apparatus for providing power saving modes to a pipelined microprocessor and for guaranteeing that the power saving instruction is the last instruction to be executed before the clocks are frozen, that upon wake-up, the next instruction executed is the first instruction in the interrupt service routine (ISR), and that upon return from the ISR, the instruction immediately following the power saving instruction is executed.

The present invention implements the following processing steps. First, a write to a power saving mode register (PCON SFR) is detected. Once this write to the power saving mode register is detected, the present invention stalls the processor. Next, a further determination is made of whether or not a powerdown bit or an idle bit is set as a result of the write. If either of these bits are set, the present invention continues to stall the processor and begins to freeze the clocks with PH1 low and PH2 high. If neither of these bits are set, the present invention restarts (i.e., ceases to stall) the processor.

A further determination is made whether or not an interrupt request is active, and the powerdown bit or the idle bit is clear. If both of these conditions are true, the present invention first restarts the clocks and then ceases to stall the processor. If either of these conditions are not true, the present invention continues to stall the clocks and the processor until both of these conditions become true.

In one embodiment, the present invention is implemented in a clock and reset unit. A power saving mode register is provided in the clock and reset unit for initiating a power saving mode. For example, a software programmer selects a particular power saving mode by setting a corresponding bit in this register (i.e., writing a predetermined value to this register).

The present invention includes a processor stall circuitry for generating a signal that indicates to the processor that a peripheral (i.e., a clock and reset unit (CRU)) is not ready to process a processor's request. The processor inserts wait states (i.e., is stalled) until the CRU is ready. The CRU is provided a signal from an interrupt handler. This signal indicates that the processor has received the interrupt request and is going to branch to the ISR at the very next instruction. In response to this signal, the CRU deasserts a not-ready request signal to the CPU, which resumes processor execution.

BRIEF DESCRIPTION OF THE DRAWINGS

FIG. 1 illustrates how a power saving mode is implemented in a sequential machine.

FIG. 2 illustrates problems associated with implementing a power saving mode in a pipelined machine.

FIG. 3 illustrates a block diagram of a general computer system in which the present invention may be implemented.

FIG. 4 illustrates a block diagram of the critical blocks and signals which are used by the present invention.

FIG. 5 illustrates in greater detail the functional blocks of the clock and reset unit of FIG. 4.

FIG. 6 illustrates in greater detail the functional blocks of the Power Save Control block of FIG. 5.

FIG. 7 illustrates a state diagram for the processor stall circuit of FIG. 6.

FIG. 10 illustrates a timing diagram of the state machine of FIG. 7 exiting the idle mode.

FIG. 11 a timing diagram of the state machine of FIG. 7 entering the powerdown mode.

FIG. 12 illustrates a timing diagram of the state machine of FIG. 7 exiting the powerdown mode.

FIG. 13 illustrates a flow chart of the processing steps implemented by the present invention.

FIG. 14 illustrates a timing diagram and the processing steps for several pipeline stages of a pipelined processor that implements the teachings of the present invention.

DETAILED DESCRIPTION OF THE INVENTION

Figure 8:
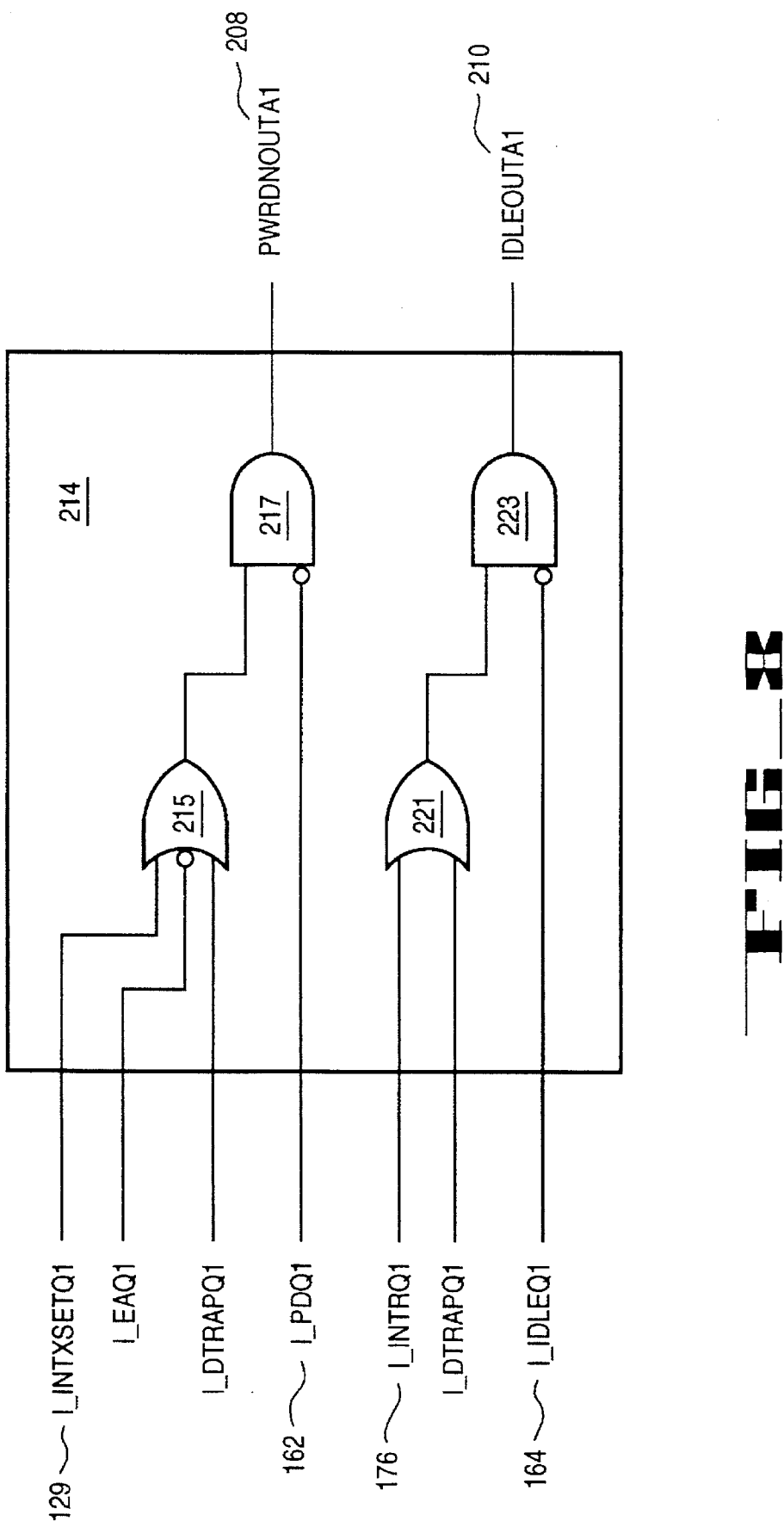
FIG. 8 illustrates a circuit for generating the PWRD-NOUTA1 signal and the IDLEOUTA1 signal.

Referring to the figures, exemplary embodiments of the invention will now be described. The exemplary embodiments are provided to illustrate the aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

FIG. 3 illustrates a block diagram of a microcontroller in which the present invention may be implemented. A microcontroller 51 includes a Processor Core 53 that is coupled to a System Bus and I/O Ports Interface 55 and Read Only Memory (ROM) 57 for storing program instruction via a memory data bus and a memory address bus. The Processor Core 53 is also coupled to Random Access Memory (RAM) 59 for storing data through data bus 73 and a data address bus 75. Microcontroller 51 also includes a plurality of peripherals 61 (e.g., a Watchdog Timer/63, timer and counters 65, a programmable counter array 67 (PCA), and a serial I/O port 69. These peripherals 61 are coupled to the Processor Core 53 via a Peripheral Interface Unit (PIU) 77 and an Interrupt Handler Unit (IHU) 81. The peripherals 61 are coupled to the Peripheral Interface Unit 77 and the Interrupt Handler Unit 81 through an internal bus (IB) 71 and an Interrupt Request (IREQ) bus, respectively, as shown in FIG. 4.

The PIU 77 acts as a bridge between the IB 71 and a data bus 73 and a data address bus 75. The IHU 81 receives interrupts from the peripherals and other devices on the IB 71 and communicates with an Instruction Sequencer 79 that is part of the Processor Core 53.

The Processor Core 53 also includes an Arithmetic Logic Unit (ALU) 85, a Register File 87 and Data Memory Interface 89. These blocks, as well as the other blocks shown in the Processor Core 53, are known in the art and will not be described further.

The present invention may be implemented in a Clock and Reset Unit (CRU 83 that is coupled to the IB 71. The CRU 83 provides a synchronized hardware reset and also clock signals to the whole computer system.

FIG. 4 illustrates a block diagram of the critical blocks and signals which are used by the present invention. As mentioned previously, the CRU 83 generates and provides a number of clock signals to the computer system (e.g., PH1 93, PH2 95, PH1S 97, PH2S 99, PH1C 101, PH2C 103).

The CRU 83 also generates a P_RDYu1 signal 105 to the Peripheral Interface Unit (PIU) 77. This signal 105 is reflected to the processor 53 as D_RDYZZ_N 121 and indicates to the processor 53 whether or not the CRU 83 is ready to process data from the Processor 53.

The CRU 83 includes a Power Save Register 84 that is accessible to software. By writing predetermined values in the power Save Register 84 the computer system enters the corresponding power saving mode. How a software instruction brings the computer system into a power saving mode is now described. First, the power saving instruction (i.e., data to be written into the power save register 84) is sent from the processor 53 to the PIU 77 by employing data bus (DDZ2X) 107 and address bus DAQ2X 109. The PIU 77 then initiates a special function register (SFR) bus cycle with SFR 83 address on IB bus 71 and asserts the IB2ARSQ1_N signal 111. The PIU 77 then provides the data to be written to the power save register 84 onto the internal bus (IB) 71 and asserts the IB2ARQ1_N signal 113 that writes the data on the IB 71 into the power save register 84. The PIU 77 asserts an AR2IBQ1_N signal 115 to read data from a special function register (SFR). In response to the signal 115, the CRU 83 provides the data from the selected SFR to the IB 71.

Data being written to the power saving register is decoded by the CRU 83. If the power saving bit is set, the CRU 83 asserts the P_RDYu1 signal 105 and provides the signal 105 to the PIU 77. This signal 105 indicates to the processor 53 that the CRU 83 needs more time to process the data. The processor 53 treats this as a wait state request and continues to stay within the power saving instruction (i.e., the instruction is writing to the power save register 84). The clocks are stopped within a few states of setting the power saving bit.

Once the processor 53 is in a power saving mode, an external interrupt may wake the processor 53 up. For example, external interrupts INT0 123 and INT1 125 are provided both to the CRU 83 and also to an Interrupt Handling Unit (IHU) 81. The leading edge of either of these external interrupts restarts the clock. At the trailing edge of the external interrupt, the P_RDYu1 signal 105 is deasserted when it is guaranteed that the external interrupt request has been posted to the CPU 53. The IHU 81 indicates to the CRU 83 that an external interrupt request is posted via an asserted INTXSETq2 signal 129 for power down mode or INTRq2 signal for idle mode. When the P_RDYu1 signal 105 is deasserted, the CPU 53 exits the power saving instruction which was halted by the CRU 83. Given that the CPU 53 processes an interrupt request at the instruction boundary, the requested interrupt will be processed at the boundary of the power saving instruction. The INTRq2 signal 127 is also generated in response to an external signal 127 provided to the IHU 81 (before P_RDYu1 is deasserted). This signal 127 is provided to the CPU 53 to request that an interrupt be processed. In response, the CPU 53 provides an INTA signal 131 to the IHU 81 when processor 53 begins to execute the ISR, corresponding to that interrupt. This signal 129 is used by a state machine (hereinafter also referred to as a processor stall signal generator state machine) inside the CRU 83 in determining when to deassert the P_RDYu1 signal 105. This processor stall signal generator state machine will be described further hereinafter with respect to FIGS. 7–11.

FIG. 5 illustrates the functional blocks in the CRU 83. The CRU 83 includes an Oscillator 143, coupled to a Divide by 2 and Phase Synchronizer 145 that is further coupled to a Non-overlapping Clock Buffer 147. The Oscillator 143 in conjunction with the Phase Synchronizer 145 and a Non-Overlapping Clock Buffer 147 produce the clock signals for the computer system.

The CRU 83 also incudes a Reset Logic 151 for receiving a Reset signal 152. This Reset Logic 151 is coupled to a Reset Synchronizer 153 that generates a synchronized reset signal (POCq2) 154. The CRU also includes a Power Save Control Block 155 for receiving the INTXSETq2 129, the INTIN0_n and the INTIN1_n (i.e., external interrupts) and also a powerdown signal 130 and an Idle signal 132. A state machine within the power save control block 155 generates an IDL_REQq1 135, a PWRDN_REQq1 signal 137, an INT0_n signal 139, an INT1_n signal 141 and the P_RDYu1 signal 105.

The CRU 83 also includes a Data Flow Control Block 157 that includes the Power Save Register 84. The data flow control block 157 interfaces the power save control block 155 with the IB 71. The power save control block 155 will be described in greater detail with respect to FIG. 6.

FIG. 6 illustrates the functional blocks in the power save control block 155. The Power Save Block 155 includes Phase Enable Circuitry 161, Power Save Request Circuitry 169, CPU Stall Circuitry 175 and miscellaneous combinational logic and latches 185.

A Processor Stall Signal Generator 175, generates the P_RDYu1 signal 105. The Processor Stall Signal Generator 175 receives the following signals: I_PDQ1 signal 162, I_PDQ1 signal 164, INTRQ1 signal 176 and the IB2ARq1_N signal 178. The I_PDQ1 signal 162 reflects the status of a bit in the power save register (i.e., PCON) 84 that indicates a powerdown mode. Similarly, the I_IDLEQ1 signal 164 represents the status of another bit in the power save register 84 that indicates an idle mode. The INTRQ1 signal 176 is similar in functionality to the INTXSETQ1 signal 129, illustrated in FIG. 5. This signal 176 indicates to a Processor Stall Signal Generator 175 that an interrupt request is active (i.e., the IHU 81 has requested an interrupt with the processor). The IB2ARQ1_N signal 178, as discussed previously, is a control signal provided by the PIU 77 to indicate to the CRU 83 that a write to a special register (in this case, the PCON register) is being initiated.

Processor Stall Signal Generator 175 can be implemented as a state machine. FIG. 7 illustrates a state machine diagram 200 for the Processor Stall Signal Generator 175 of FIG. 6. The output of the Processor Stall Signal Generator 175 is the P_RDYu1 signal 105. The Processor Stall Generator 175 generates the output signal, I_PRDYQ1_n 201. This signal 201 is gated with the gated_PH2S_N signal 202 via the flip-flop circuitry 198 to generate the P_RDYu1 signal 105.

The Processor Stall Signal Generator state machine diagram 200 has four states: a NORMAL state 203, a PCONWRITE state 205, a PWRDNMODE state 207, and an IDLEMODE state 209. The Processor Stall Signal Generator 175 is reset into the NORMAL state 203 by the I_RSTVLATEQ1 signal 204. If a write (IB2ARQ1_n signal 178 asserted) is detected to the PCON register (I_DECODEQ1_n# signal 204 is asserted), then Processor Stall Signal Generator 175 transitions from the NORMAL State 203 to the PCONWRITE state 205. If the powerdown bit is set in the PCON register (i.e., I_PDQ1 signal 162 is asserted), then the Processor Stall Signal Generator 175 transitions from the PCONWRITE State 205 into the PWRDNMODE state 207.

If the idle bit in the PCON register is set (i.e., the I_IDLEQ1 signal 164 is asserted), then Processor Stall Signal Generator 175 transitions from the PCONWRITE State 205 to the IDLEMODE state 209. If neither the powerdown bit nor the idle bit is set, state machine 200 transitions from the PCONWRITE State 205 back to the NORMAL State 203. Once in the PWRDNMODE state 207, Processor Stall Signal Generator 175 stays in the PWRDNMODE state 207 until the PWRDNOUTA1 signal 208 is asserted. How this signal 208 is generated will be described in detail hereinafter with reference to FIG. 8.

Once Processor Stall Signal Generator 175 is in IDLEMODE State 209, it continues in IDLEMODE State 209 until IDLEOUTA1 signal 210 is asserted. The details of how IDLEOUTA1 is generated will be described hereinafter with reference to FIG. 8.

FIG. 8 illustrates a circuit 214 for generating the PWRDNOUTA1 signal 208 and the IDLEOUTA1 signal 210. The circuit 214 includes 215, 221, 217, 223, and a number of inverters. PWDNOUTA1 signal 208 is generated when the I_PDQ1 signal 162 is cleared (i.e., the powerdown bit in the PCON register is cleared), and the interrupt set signal (I_INTXSETQDQ1) 129 is active (indicating that an interrupt request has been generated by the IHU to the processor). The IDLEOUTA1 signal 210 is generated when the I_IDLEQ1 signal 164 is low (i.e., the idle bit in the PCON is cleared), and the interrupt request (i.e., I_INTRQ1) is active.

The output of the state machine is PRDYYQ1_n which feeds into the pull down component, illustrated in FIG. 7, to generate P_RDYu1 on PH2SI.

Figure 9:
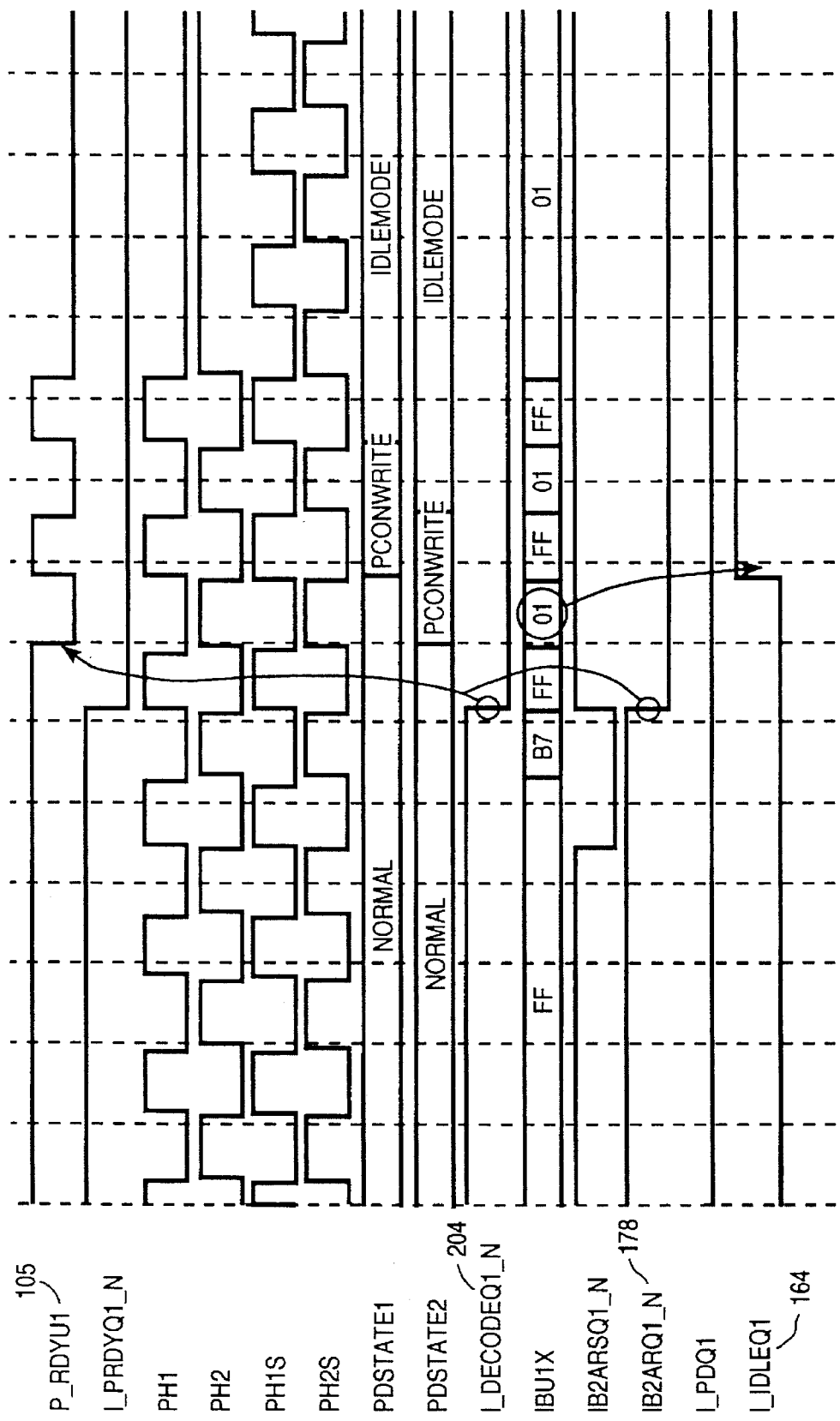
FIG. 9 illustrates a timing diagram of the state machine of FIG. 7 entering the idle mode.

FIG. 9 illustrates a timing diagram of State Machine 200 transition from the Normal State 203 to the PCON Write State 205 into the Idle Mode State 209. The I_DECODEQ1_n signal 204 and the IB2ARQ1_n signal 178 trigger P_RDYu1 signal 105 to be de-asserted. Moreover, signal 204 and 178 transition the PD state 1 from normal into PCON write state. As a data one is written from the IBU1X bus, this sets the I_IDLEQ1 signal 164 that transitions the PD state 1 into the idle mode.

FIG. 10 illustrates a timing diagram showing the State Machine 200 exiting idle mode. The INTRQ2 signal 176 and I_IDLEQ signal 164 cause the IDLEOUTA1 signal to be asserted. The IDOUTA1 signal in turn transitions the state machine from the idle mode state into the normal state and asserts the I_PRDYQ1_n signal.

FIG. 11 illustrates a timing diagram of State Machine 200 entering into the powerdown mode state. As in the idle mode case, the IB2ARSQ1_n signal 178 and the IDCODEQ1_n signal 204 trigger the P_RDYu1 signal 105 to be asserted. As the P_RDYu1 signal 105 becomes de asserted, it stalls the processor. When a value of two is written from the IBU1X into the PCON register, the State Machine 200 transitions from the PCON write state into the powerdown mode state.

FIG. 12 illustrates a timing diagram of how state machine 200 exits the powerdown mode state. First, the IPDQ1 signal 162 becomes de-asserted, and the INTXSETQ1 signal 129 is asserted. This causes PWRNDOUtA1 signal 208 to become asserted. The asserted PWRDNOUT1 signal 208 triggers the transition from the powerdown mode into a normal state and also causes the P_RDYu1 signal 105 to become de-asserted.

FIG. 13 illustrates the processing steps implemented by the present invention. First, a determination is made of whether or not a write to a PCON SFR is detected (decision block 230). If no, the processing returns to node A. If yes, the present invention stalls the processor (processing step 234).

Next, a determination is made of whether or not the PCON powerdown or idle bit is set as a result of the write (decision block 238). If not, the present invention ceases to stall the processor (node A). If yes, the present invention continues to stall the processor and freezes the clocks (processing step 242).

A further determination is made of whether or not an interrupt or reset has been detected (decision block 243). If no, the present invention continues to stall the processor and to freeze the clocks (processing step 242). If yes, the present invention enables the clocks, and the clocks resume their operation (processing step 244).

After the clocks have resumed, a further determination is made of whether or not an interrupt request is active, and the powerdown or idle bit is clear (decision block 246). If no, the present invention continues to stall the processor (processing step 244). If yes, the present invention ceases to stall (i.e., restarts) the processor (processing step 248). Then, processing continues to node A.

FIG. 14 illustrates the processing that takes place in several pipeline stages of a pipelined processor that implements the teachings of the present invention. The present invention asserts the not-ready request at State 6 (S6). This asserted not-ready request keeps the processor in the write stage, associated with the first instruction. When the clocks freeze in State 7 (S7), the processor is still in the execution and write of the first instruction. Upon wake-up, the present invention insures that the processor is still in the execution and write, associated with the first instruction. Thus, the present invention insures those desirable attributes discussed previously.

A variety of hardware and software functions have been described herein. Depending upon the implementation, many of the hardware functions may be emulated using software. Likewise, software functions may be performed using hardware components having hardwired circuitry configured to perform the functions. In other implementations, some of the hardware or software functions may be configured using firmware or other computer system implementation technologies.

The exemplary embodiments described herein are provided merely to illustrate the principles of the invention and should not be construed as limiting the scope of the inven-

I claim:

1. In a computer system having a pipelined processor, said processor receiving a plurality of clock signals, a method for providing power saving modes to the pipelined processor and for guaranteeing that a power save instruction is a last instruction to be executed before the clocks are frozen, that upon wake-up a next instruction executed is a first instruction in an interrupt service routine (ISR) and that upon return from the ISR, an instruction immediately following a power saving instruction is executed, said method comprising the steps of:

a) detecting a write to a power saving mode register;

b) if a write to the power saving mode register is detected, stalling the processor, else return to step (a);

c) determining if a power saving mode bit is set as a result of the write;

d) if the power saving mode bit is set, continue stalling the processor and freeze the clocks, else restart the processor and return to step (a);

e) determining if an interrupt request is active and the power saving mode bit is clear; and f) if the interrupt request is active and the power saving mode bit is clear, restart the processor and returning to step (a), else, continue stalling the processor and return to step (f).

2. The method of claim 1 wherein the step of stalling the processor includes deactivating the clock signals that are provided to the processor.

3. The method of claim 1 wherein the step of restarting the processor includes restarting the clock signals that are provided to the processor.

4. The method of claim 1 wherein the power saving mode bit is a powerdown bit.

5. The method of claim 1 wherein the power saving mode bit is an idle bit.

6. In a computer system having a pipelined processor, said processor receiving a plurality of clock signals, said computer system comprising:

a) a bus, coupled to the processor, for transferring information;

b) a clock and reset unit, coupled to the bus, for providing the plurality of clock signals to the computer system and also a reset signal to the computer system, said clock and reset unit including i) a detection circuit for detecting a write to a power saving mode register, disposed in the clock and reset unit;

ii) a stalling circuit, coupled to the detection circuit, for stalling the processor if a write to the power saving mode register is detected by the detection circuit;

iii) a first determination circuit for determining if a power saving mode bit is set as a result of a write to the power saving mode register;

iv) means, coupled to the first determination circuit, for continuing to stall the processor and freezing the clocks if the power saving mode bit is set and for ceasing to stall the processor if the power saving mode bit is not set; and v) a second determination circuit, coupled to the bus, for determining if an interrupt request is active and if the power saving mode bit is clear, said second determination circuit ceasing to stall the processor and enabling the clocks if the interrupt request is active and the power saving mode bit is clear, and for continuing to freeze the clocks and to stall the processor in the alternative.

* * * * *